Patented Mar. 18, 1941

2,235,634

UNITED STATES PATENT OFFICE 2,235,634

SILVER SOLDER

Franz R. Hensel, Kenneth L. Emmert, and James W. Wiggs, Indianapolis, Ind., assignors to P. R. Mallory & Co., Inc., Indianapolis, Ind., a corporation of Delaware No Drawing. Application August 15, 1939, Serial No. 290,221

11 Claims. (Cl. 75—173)

This invention relates to a metallic material used in the art of joining metals, for example, a brazing material or composition, a silver solder or the like.

An object of the invention is to improve brazing materials, silver solder and the like.

Other objects of the invention will be apparent from the following description taken in connection with the appended claims.

The present invention comprises the combination of elements, methods of manufacture, and the product thereof brought out and exemplified in the disclosure hereinafter set forth, the scope of the invention being indicated in the appended claims.

While a preferred embodiment of the invention is described herein, it is contemplated that considerable variation may be made in the method of procedure and the combination of elements without departing from the spirit of the invention.

Heretofore silver solders, consisting principally of silver, copper, zinc and cadmium in various proportions have found wide use in industry. In proportioning the components of silver solders an object is to obtain a resulting alloy which will possess a melting point low enough to join ferrous or non-ferrous metals depending on the application for which the solder is intended. It is furthermore essential to have a satisfactory flow point, which is the temperature at which the composition would wet readily the materials to be joined. In alloys, solidification depends on the structure and on the composition, the solidus and liquidus curves and also on the formation of eutectics. Very often when the solidus and liquidus curves are far apart the material will go through a mushy state before reaching the highest degree of fluidity. It has, therefore, been necessary to produce binary, ternary and possibly quaternary eutectics which would result in a flow point almost identical with the melting point. The prior art has established that certain percentage ratios of silver, copper, zinc and cadmium may be used to accomplish this purpose. In many cases silver solders, for instance, are based on the binary silver-copper eutectics with the addition of zinc to produce a ternary eutectic of a still lower melting point.

The object of the prior art, therefore, can be summarized as being directed to obtain good flowing and wetting characteristics by the addition of substantial amounts of alloying ingredients whereby the flowing characteristics can be predetermined.

The present invention relates to a further improvement of this type of materials of the prior art. This improvement is obtained by the addition of small quantities of lithium. It was found that the improvements obtained with the addition of lithium are primarily due to the fact that lithium combines readily with such elements as oxygen, hydrogen, nitrogen, oxides and other impurities which are formed when the metal is brought into the molten condition by the application of heat either by means of a torch or the electric arc or any other means.

Even with the alloys of the prior art having a low flow-point it is impossible to obtain satisfactory wetting without the use of fluxing materials which either reduce the oxides formed or which will dissolve the same. It has been one of the outstanding disadvantages of these materials that a large quantity of such fluxes is required which in many cases are difficult to remove after the brazing operation and which frequently cause corrosion, blow holes and similar disadvantages.

It has been found that the present invention overcomes these shortcomings, due to the high affinity of lithium for practically all elements occurring as non-metallic impurities, such as oxides, nitrides or gases which permit the use of lithium as a highly efficient scavenger agent. It was found that the amount of lithium useful for the purposes intended could vary from .01 to 3%.

In instances where materials have to be brazed which contain such metals as chromium, molybdenum, tungsten, which oxidize readily at elevated temperatures the present methods for silver soldering have been unsatisfactory and failures have occurred due to unsound brazes. It has been necessary to go to complicated methods of first tinning or coating the materials to be united before any brazing could be attempted. It was furthermore necessary to use expensive fixtures in order to apply sufficient pressure to squeeze out the remaining fluxes.

In other cases it was necessary to use as fluxing ingredients fluorides or chlorides which endanger the health of the operator carrying out the brazing operations.

The present invention was tested with the most difficult materials such as tungsten, molybdenum and chromium-bearing ferrous alloys. It was found that the use of lithium improves the flowing and wetting characteristics of the solders to such an extent that the amount of flux could be materially reduced and in certain instances completely eliminated. The joints when tested showed values of strength exceeding those obtained by using the fluxes and the methods of the prior art. Inclusions of slag or residual flux was completely eliminated. This also produced another advantage permitting the silver solder to diffuse more readily within the pieces to be joined together.

It was also found that due to the great improvement in flowing characteristics a considerably smaller amount of silver solder could be used in uniting the two metals than was possible with the materials of the prior art. This resulted in an additional saving.

The experiments covering the addition of lithium to silver solders was extended over a large range of silver solders generally used in the industry as can be seen from the following table:

| Grade No. | Silver | Copper | Zinc | Cadmium | Lithium | Other ingredients |
|---|---|---|---|---|---|---|
| | Per cent | Per cent | Per cent | Per cent | Per cent | |
| 1 | 10 | 52 | 37.75 | 0 | .25 | |
| 2 | 20 | 45 | 34.75 | 0 | .25 | |
| 3 | 20 | 45 | 29.60 | 5 | .40 | |
| 4 | 45 | 30 | 24.90 | 0 | .10 | |
| 5 | 50 | 34 | 15.85 | 0 | .15 | |
| 6 | 65 | 20 | 14.5 | 0 | .5 | |
| 7 | 70 | 20 | 9.7 | 0 | .30 | |
| 8 | 80 | 16 | 3.65 | 0 | .35 | |
| 9 | 10 | 69.6 | 20 | 0 | .4 | |
| 10 | 55.8 | 20 | 0 | 24 | .2 | |
| 11 | 46.7 | 16 | 15 | 22 | .3 | |
| 12 | 15.5 | 70 | 0 | 0 | .5 | 14 Sn |
| 13 | 15 | 79.75 | 0 | 0 | .25 | 5 Phos. |
| 14 | 60 | 29.70 | 0 | 0 | .3 | 10 Mn |
| 15 | 60 | 20 | 14.75 | 0 | .25 | 5 Ni |

From the above table it is evident that the amount of lithium required for satisfactory brazing can, in most cases, be below 1% of lithium. This has the advantage that with the lower lithium contents the material is much more readily workable and can be rolled into strip, sheet and wire, in which form the silver solders are most generally used. We have found that in many cases a lithium content in the nature of one-tenth of 1% will result in a remarkable improvement in the properties of silver solders. Silver solders which can be improved by the addition of lithium will fall within the composition range 5 to 85% silver, 5 to 70% copper with or without the addition of other ingredients particularly cadmium, zinc, tin, manganese, nickel and phosphorus in the following proportions:

|  | Per cent |
|---|---|
| Cadmium | up to 25 |
| Zinc | up to 40 |
| Manganese | up to 20 |
| Nickel | up to 10 |
| Phosphorus | up to 5 |
| Tin | up to 15 |

Most of the useful silver solders will have compositions falling within the range

|  | Per cent |
|---|---|
| Silver | 10 to 80 |
| Copper | 15 to 60 |
| Zinc | up to 38 |
| Cadmium | up to 20 |

While the present invention, as to its objects and advantages, has been described herein as carried out in specific embodiments thereof, it is not desired to be limited thereby but it is intended to cover the invention broadly within the spirit and scope of the appended claims.

What is claimed is:

1. A silver solder containing at least 5% silver and characterized by the presence of a small quantity of lithium as an alloying ingredient therein.

2. A silver solder containing at least 5% silver and characterized by the presence of .01 to 3% lithium as an alloying ingredient therein.

3. A silver solder containing 5 to 85% silver, 5 to 70% copper and .01 to 3% lithium.

4. A silver solder containing 10 to 80% silver, 15 to 60% copper and .01 to 3% lithium.

5. A silver solder whose essential ingredients are silver and lithium.

6. A silver solder whose essential ingredients are silver, copper and lithium.

7. A silver solder having lithium as an ingredient.

8. A silver solder having as an ingredient lithium in proportions of .01 to 3% of the total composition.

9. A free-flowing, ready-wetting and strong-bonding silver solder containing 5 to 85% silver, 5 to 70% copper, .01 to 3% lithium and any other metal or metals which are not subversive of the above characteristics.

10. In a composite article made up of two or more independently formed metal parts, the combination with said metal parts of a silver solder bonding said parts together by molecular adhesion, said solder being composed of an alloy containing silver and lithium as essential ingredients.

11. A composite metal article having two abutting metal surfaces and a silver solder layer between said surfaces and bonded to both, said solder containing as essential ingredients 5 to 85% silver, 5 to 70% copper and .01 to 3% lithium, the balance of the composition of said solder being any other metals which are not subversive of the free-flowing, ready wetting and bonding characteristics of said solder.

FRANZ R. HENSEL.
KENNETH L. EMMERT.
JAMES W. WIGGS.